United States Patent [19]
McMurtry

[11] 3,711,723
[45] Jan. 16, 1973

[54] OPTICAL SYSTEM FOR OPTICAL FIBER BUNDLE SCANNING APPARATUS

[75] Inventor: David Harwood McMurtry, Portola Valley, Calif.

[73] Assignee: International Business Machines Corporation, Armonk, N.Y.

[22] Filed: Feb. 4, 1972

[21] Appl. No.: 223,603

[52] U.S. Cl. ...250/219 D, 235/61.11 E, 250/219 CR, 250/227
[51] Int. Cl. ......G01n 21/30, G02b 5/14, G06k 7/00
[58] Field of Search............250/227, 219 CR, 219 D; 235/61.11 E

[56] References Cited

UNITED STATES PATENTS

| | | | |
|---|---|---|---|
| 2,451,014 | 10/1948 | Zworykin et al. | 250/219 CR |
| 3,305,689 | 2/1967 | Leavy, Jr. et al. | 250/227 |

*Primary Examiner*—James W. Lawrence
*Assistant Examiner*—T. N. Grigsby
*Attorney*—George E. Roush et al.

[57] ABSTRACT

An elongated optical fiber bundle used in a manual scanning system having a high intensity light source is protected from the adverse effects of the high temperature involved by the optical system disclosed. The proximal end of the fiber bundle is illuminated by light from a source and associated elliptical reflector brought to a focus at the face of the bundle. An annular heat and flare shield is interposed between the light source and the bundle with the aperture about the end of the bundle, preferably the aperture of the shield has a conical wall slightly beyond a conical annulus of the light beam. This annular light configuration is brought about by the imposition of a mirror having a central aperture between the light source and the bundle for permitting light from the bundle to pass directly to a photosensitive device. Heat from light energy passing through the aperture without reflection to the bundle for illumination thereof is dissipated by a heat radiator positioned beyond the mirror aperture. The efficiency of heat radiation is maximized by locating the heat radiator at the focal point of the light energy passing through the mirror aperture.

10 Claims, 3 Drawing Figures

PATENTED JAN 16 1973 3,711,723

OPTICAL SYSTEM FOR OPTICAL FIBER BUNDLE SCANNING APPARATUS

The invention of the instant application stems from the endeavors resulting in the inventions described and claimed in the copending U.S. Pat. applications, Ser. No. 158,366 of David Harwood McMurtry filed on the 30th day of June 1971 for "Hand Probe for Manually Operated Scanning System," Ser. Number 198331 of Jerome Danforth Harr filed on the 12th day of Nov. 1971 for "Optical Bar Coding Scanning Apparatus," and Ser. No. 223555 of Jerome Danforth Harr and David Harwood McMurtry filed on the same day as the instant application for "Manually Operated Optical Bar Coding Scanning System."

The invention relates to optical scanning systems, and it particularly pertains to high intensity light sources and associated photosensitive device optics for hand held probes in such systems, especially for scanning documents having indicia thereon in the form of closely spaced parallel lines or bars.

Optical scanning systems of the type hereinafter disclosed are old in general as is reflected in the following U.S. Pats. Nos.

| | | | |
|---|---|---|---|
| 2,406,299 | 8/1946 | Koulicovitch | 250–41.5 |
| 2,420,716 | 5/1947 | Morton et al. | 250–41.5 |
| 3,016,785 | 1/1962 | Kapany | 88–1 |
| 3,214,596 | 10/1965 | Schwerdt et al. | 250–239 |
| 3,229,075 | 1/19606 | Palti | 235–61.11 |
| 3,238,501 | 3/1966 | Mak et al. | 340–146.3 |
| 3,278,754 | 11/1966 | Wallace | 250–223 |
| 3,305,689 | 2/1967 | Leavy et al. | 250–227 |
| 3,327,584 | 6/1967 | Kissinger | 88–14 |
| 3,359,405 | 12/1967 | Sundblad | 235–61.11 |
| 3,437,804 | 4/1969 | Schaefer et al. | 240–41.35 | in the following foreign patent:

| | | | |
|---|---|---|---|
| Russian | 10/1967 | Moroz | 195,033 | and in the following article in the technical literature: M. Sokolski, "Improved Fiber Optic Read Head," IBM Technical Disclosure Bulletin, Vol. 8, No. 11, Apr. 1966, page 1580.

These prior art arrangements serve well for the purposes intended. However, they are incapable of providing the high luminous intensity needed and too unwieldy for the large optics used in present day applications.

The objects indirectly referred to hereinbefore and those that will appear as the specification progresses are attained in a high intensity light source for a hand held probe of simple construction. Basically, a single coherent optical fiber bundle has the distal end arranged for direct contact with the document to be scanned. At the proximal end light from a suitable source of illumination is focused onto the face of the bundle for transmitting light down to the document through the optical fibers. Light from these optical fibers impinges on the document and is reflected in proportion to the presence or absence of marking on the document. The reflected light is transmitted back up the fibers to a photosensitive device which is arranged beyond the proximal end. Electronic circuitry connected to the photosensitive device is arranged for reducing the data determined by scanning for application to the data processing system. The desired intensity of the light and the desired resolution of the indicia on the document frequently call for optical components much larger than conveniently installed in a hand held probe of the desired size and configuration.

According to the invention the illuminating and sensing components are arranged in a cabinet or housing of suitable size and a much smaller probe comprising a flexible coherent fiber optical bundle is connected to the components in this cabinet. Heat is generated by the larger light sources used, and this heat is dissipated as much as possible in heat sinks arranged at predetermined points in the optical system.

Further according to the invention the distal end of the optical fiber bundle is fitted with a tubular focusing reflector arranged for refocusing light from the fibers to the document and a short focal length lens system arranged in the bore of the reflector for imaging the document onto the distal end of the bundle. This arrangement obviates loss of focus due to tilting of the probe by the operator.

In order that full advantage of the invention may be obtained in practice, preferred embodiments thereof, given by way of example only, are described in detail hereinafter with reference to the accompanying drawing, forming a part of the specification, and in which.

Figure 1:
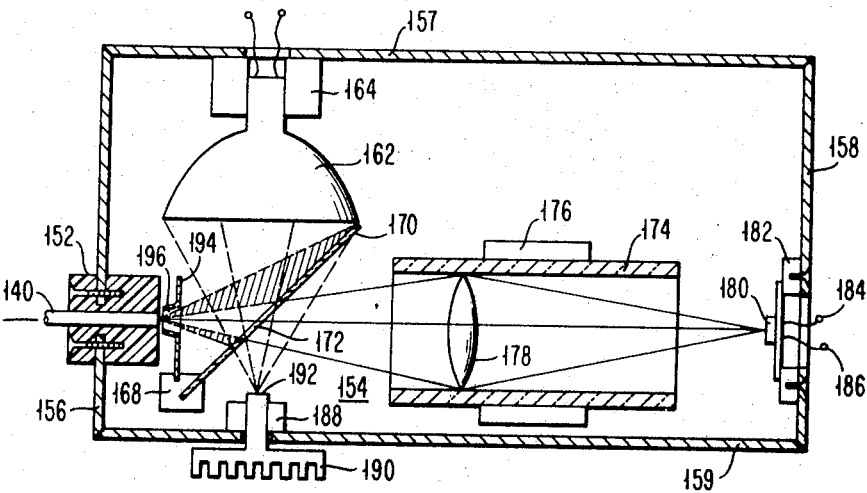
FIG. 1 is an illustration of the optical system according to the invention.

A preferred embodiment of the invention is shown in FIG. 1. In the simplest arrangement the fact of an imaging optical fiber bundle 140 is in contact with a document 142 to be scanned. Because of wear and other factors the face of the optical fiber bundle 140 is preferably maintained above the document 142 at a spacing of the order of 0.005 inch by means of a tubular probe member surrounding the bundle 140. As shown there is a tubular handle 144 of a suitable metal or plastic material and a tubular nosepiece 146. The nosepiece is preferably made of "nylatron"—a graphite impregnated material similar to "nylon" or other polymeric amide. An optical fiber bundle assembly is affixed in the handle 144 with the facing of the bundle 140 recessed from the tip of the nosepiece 146.

There are several optical fiber bundle assemblies commercially available. Discrete optical fibers are carefully conformed ant then held firmly at the two ends. A preferred arrangement is available in the form of a bundle 140 of optical fibers enclosed in a flexible vinyl sheath 148 which is filled with an aqueous solution for insulating and lubricating the individual fibers. Flexible metal or plastic armor 150 is designed to restrain the bending of the fibers below the generally accepted limit of twenty fiber diameters for prolonging the life of the assembly and insuring proper operation. The imaging optical fiber bundle 140 has the proximal end clamped in a fiber block 152 which is rigidly supported on an optical bench member 154 delineated by cabinet wall portions 156–159. The optical bench member 154 is characterized by that rigidity which is necessary to optical systems of the type disclosed herein and is altogether conventional in this and other respects. The end of the optical fiber bundle 140 is exposed to the interior of the cabinet at or near the edge of the fiber block 152. Preferably the exposed end is given an anti-reflection coating of conventional material for the purpose. A suitable light source, for example, an ENA quartz iodine lamp, is arranged at the focal point of an aluminized elliptical reflector 162. This lamp and reflector combination is rigidly held in place upon the optical bench member 154 by a supporting post 164 of conventional construction. A heat insulating supporting post 168 is fastened to the optical bench member 154 for supporting a dichroic mirror 170 at an angle of substantially 45° to the central axis of the reflector 162 and to the longitudinal axis of the clamped end portion of the optical fiber bundle 140. The lamp and reflector assembly, the mirror 170 and the face at the proximal end of the bundle 140 are arranged so that the light rays from the reflector 162 come to a focus at face of the optical fiber bundle 140. Although the conventional point focus is illustrated, it should be understood by those skilled in the art that a field substantially the diameter of the bundle 140 is involved here and at other focal points in the system according to the invention. The mirror 170 has an elliptical aperture 172 on the axis of the optical fiber bundle 140. An optical lens system 174 is arranged on this same axis and held rigidly in place on a supporting post 176 rigidly mounted on the optical bench member 154. This lens system 174 is entirely conventional in all respects and is represented here merely by a schematic illustration of a lens 178. By means of the lens system 174 light from the optical fiber bundle 140 is focused on a photoresponsive device 180. The device 180 may be any one of a large number of known photoresponsive devices. It is particularly contemplated, however, that the device 180 be one of the sectored photoresponsive devices as shown and described in the copending U.S. patent application of Jerome Danforth Harr abovementioned. In any case the photosensitive device is supported by a mounting post 182 rigidly attached to the optical bench member 154. Electric leads 184 and 186 are led through an opening in the wall member 158. The post 182 is arranged to seal the opening to prevent light from straying. A further post 188, rigidly attached to the optical bench member 154, supports a heat radiating element 190. The innermost face of the radiator 190 is arranged at the other focal point of the elliptical reflector 162 so that the visible light passing through the aperture 172 in the mirror 170 and the infra red light passing through the mirror is brought to a field focus at the interface 192. The interface 192 is preferably blackened for maximum heat transfer out of the cabinetry through an aperture in the wall member 159. Thus excess heat is delivered to the heat sink and radiated externally of the optical system for that light not reflected by the mirror 170. The conical annulus of light reflected by the mirror 170 tends to generate considerable heat at the proximal face of the bundle 140. To prevent the optical fibers from melting, a heat and flare shield 194 is supported by the supporting post 168 in front of the fiber block 152. The shield 194 has an aperture 196 about which there is a collar 198 which is separated from the proximal face of the bundle 140 and the fiber block 152 by a small air gap. The shield 194 is also given a flat black surface by painting or anodizing and the like.

Figure 2:
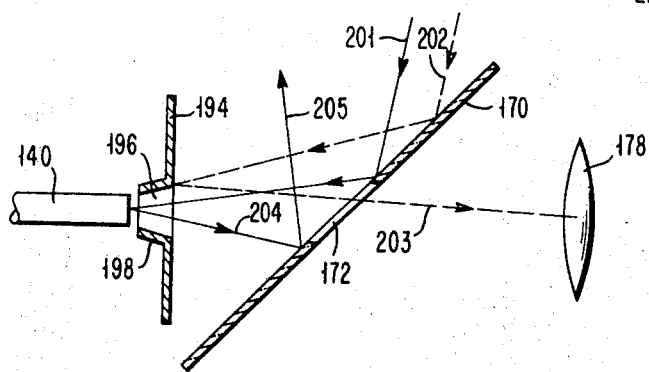
FIG. 2 is a graphical representation of the operation of a portion of the arrangement shown in FIG. 1.

The operation of the shield 194 is diagrammed in FIG. 2. Light rays intended for illuminating the document such as the ray 201 are reflected from the mirror 170 onto the proximal face of the bundle 140. Other light rays such as ray 202 are prevented from reaching the bundle 140 by the shield 194. The black matte surface on the shield 194 prevents reflection of a ray such as ray 203 from passing through the aperture 172 in the mirror 170. Any light rays such as ray 204 emanating from the optical fiber bundle 140 at an angle outside the aperture 172 are reflected back into the reflector 162 for augmenting the light source. No stray light then enters the lens 178.

The input end of the optical fiber image bundle 140 must have a very flat and highly polished specular (or reflective) surface set normal to the optical axis. It preferably has an anti-reflection coating. There will be some specular reflection off the surface due to the incoming light (4 percent without the coating). It is important that this specular reflection not be reflected back into the lens but rather onto the mirror surface where it will be harmlessly diverted as shown in FIG. 2.

The fiber bundle 140 is preferably made with material graded a small numerical aperture glass type. When the distal end riding on the surface of the document is tilted by the human operator the fiber optic surface pivots away from the surface of the document thus losing some of the focus. A low numerical aperture image optical fiber bundle has a greater inherent depth-of-focus and is thus less sensitive to tilting.

Figure 3:
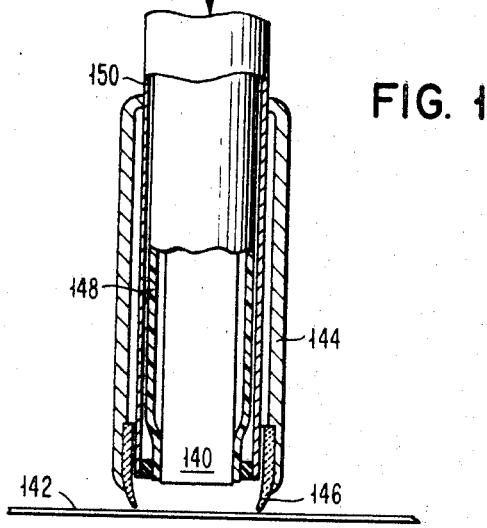
FIG. 3 is an illustration of an alternate probe tip according to the invention.
Figure 3:
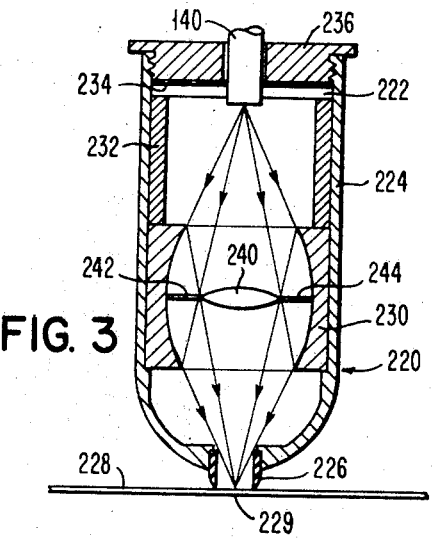

FIG. 3 shows an embodiment of a probe assembly 220 according to the invention which is relatively insensitive to tilting. The optical fiber bundle 140 is anchored in an annular fiber block 222 in conventional fashion. The latter is mounted in a molded casing 224 of convenient dimensioning for a hand-held probe. A tubular nosepiece 226 preferably provided at the tip. This is preferably made of "Nylatron"—a graphite impregnated nylon—or other material having a characteristic reducing the coefficient of friction on a document 228. A tubular focusing reflector 230 is arranged in the casing 224 and held in place by a tubular member 232, the block 222, a light spring washer 234 and an end cap 236, the latter being threaded into the casing 224 to hold the assembly firmly. The light rays exit from the face of the bundle 140 in exactly the same conical annulus in which they entered independent of any flexing of the bundle 140 that may have taken place. They impinge upon the reflective, curved inner surface of the tubular reflector 230 and focus on the surface of the document 229. A lens 240 is arranged at the proximal end in the center of the tubular mirror 230 for imaging the illuminated document 228 onto the distal end of the image bundle 140. The image is transmitted to the photosensitive device 180. It is contemplated that the lens 240 be arranged in a frustro-conical tubular member supported at one end by a conical glass support extending to and held in the casing 224 by conventional means. The support is preferably arranged with the light rays passing substantially normally through the glass whereby there will be but little distortion and/or loss of light transmitted to the document 228. Preferably, the lens 240 is arranged in a conventional ring mounting and three or four spider legs of which two, 242 and 244, are shown. Less than 3 percent of the available light is blocked in this arrangement. The spider legs are preferably cemented at the ends of narrow grooves (not shown) cut halfway into the tubular reflector 230 from the end remote from the bundle 140. In this arrangement, the grooves lie in the shadows of the legs so that no additional loss of light is encountered. Alternately, the reflector is made in two pieces with provisions for holding the spider legs.

The lens is set such that it lies completely within a biconical "dark zone" formed by the rays of light. Thus no incoming light strikes the lens; it travels around the lens to the document 228. Since the lens must of necessity have a short focal length, it will have a large depth of field and will be insensitive to large angles of tilt.

While the invention has been shown and described particularly with reference to a preferred embodiment thereof, and various alternatives have been suggested, it should be understood that those skilled in the art may effect still further changes without departing from the spirit and scope of the invention as defined hereinafter.

The invention claimed is:

1. An optical system for use with scanning apparatus having an optical fiber bundle arranged for illuminating a document to be scanned at the distal end and for transmitting reflected light from said document to the proximal end of the bundle comprising
   an optical bench member,
   a supporting member for supporting the proximal end of said optical fiber bundle fixed with respect to said bench member,
   a photosensitive device arranged on said bench member for receiving light from the proximal end of said bundle
   a mirror arranged on said bench member and interposed between said photosensitive device and the proximal end of said bundle and having a central aperture positioned for passing light therebetween,
   a source of light and a reflector therefor arranged on said bench member and arranged for directing light onto said mirror and focussing that light at the proximal end of said bundle.

2. An optical system as defined in claim 1 and incorporating,
   a heat and flare shield arranged on said bench member and having a central aperture about the proximal end of said bundle for transmitting light to said bundle and for radiating heat caused by light energy impinging thereon away from said bundle.

3. An optical system as defined in claim 1 and incorporating
   a heat radiating element arranged on said bench member and on a side of said mirror remote from said light source and reflector at a distance at which the light passing through said aperture in said mirror is brought to a focus for radiating heat energy caused by the light impinging thereon.

4. An optical system as defined in claim 1 and wherein
   said mirror is dichroic and reflects light in the frequency spectrum to which said photosensitive device is responsive.

5. An optical system as defined in claim 1 and wherein
   said reflector is elliptical and said light source is positioned at focal point of said reflector.

6. An optical system as defined in claim 1 and wherein
   said optical fiber bundle is of the imaging form and
   an image of that portion of said document is superimposed on said photosensitive device.

7. An optical system as defined in claim 1 and incorporating
   a tubular focusing reflector arranged at the distal end of said optical fiber bundle.

8. An optical system as defined in claim 7 and incorporating
   a lens positioned within said tubular focusing reflector for transmitting light reflected from said document only to the distal end of said optical fiber bundle for further transmission to said photosensitive device.

9. An optical system as defined in claim 1 and incorporating
   a lens interposed between the distal end of said optical fiber bundle and said document.

10. An optical system as defined in claim 9 and wherein
    said lens is of short focal length.

* * * * *